United States Patent Office 2,949,431
Patented Aug. 16, 1960

2,949,431

PREPARATION OF CELLULAR POLYURETHANES USING PIPERAZINE CATALYSTS

J. W. Britain, Hillside, W. Va., assignor to Mobay Chemical Company, St. Louis, Mo., a corporation of Delaware No Drawing. Filed July 17, 1957, Ser. No. 672,343

12 Claims. (Cl. 260—2.5)

This invention relates generally to a novel class of chemical compounds and, more particularly, to a class of compounds adapted for use as catalysts in the manufacture of cellular polyurethane plastics and to an improved process for making such plastics.

A solidified cellular polyurethane plastic may be formed by reacting an organic compound having reactive hydrogen atoms, such as, for example, a polyester, a polyester amide, a polyalkylene ether or a polyalkylene thioether having terminal hydroxyl groups with a polyisocyanate and thereafter reacting the resulting isocyanate-modified product with water. When the water reacts with the NCO groups in the isocyanate-modified product and with NCO groups of any unreacted polyisocyanate present in the reaction mixture, carbon dioxide is formed which is entrapped in the viscous reaction mixture. The product obtained upon solidification has a porous or cellular structure.

It has been proposed heretofore to include a tertiary amine in the reaction mixture to accelerate the reaction between the isocyanate-modified polyhydroxy compound and the water. By properly choosing one of the heretofore available tertiary amine catalysts, a cellular polyurethane plastic having certain desired characteristics and foam processes having predetermined reaction rates may be devised. However, most of the heretofore available tertiary amines have some undesirable characteristics which detract from their general advantageous properties when used as a catalyst in a polyurethane plastic reaction mixture. Some are very volatile and evaporate from the reaction mixture as the water reacts with the NCO groups, while others remain in the solidified product and impart an obnoxious odor which remains throughout much of the life of the plastic. Other tertiary amines have a relatively low vapor pressure and may not impart obnoxious odors to the product, but these amines impart other harmful effects to the product. For example, the reaction mixture and solidified product are toxic or the amines act as a solvent which dissolves or otherwise affects paint and other coating compositions which may come in contact with the cellular plastic.

It is therefore an object of this invention to provide a novel class of chemical compounds. Another object of the invention is to provide a novel class of tertiary amines particularly well suited as catalysts in the manufacture of cellular polyurethane plastics. Still another object of the invention is to provide an improved catalyst for making cellular polyurethane plastics. A further object of the invention is to provide an improved process for making cellular polyurethane plastics free from the undersirable characteristics heretofore present in most available plastics of this general type. A more specific object of the invention is to provide a class of tertiary amines and a process for making the same, which amines have desirable volatility, odor, water solubility and catalytic activity characteristics.

The foregoing objects as well as others are accomplished in accordance with this invention, generally speaking, by providing a novel class of tertiary amines having the general formula

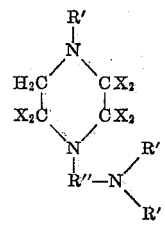

wherein R' is an alkyl radical having from 1 to 4 carbon atoms, R'' is an alkylene radical having from 2 to 4 carbon atoms, and X is either hydrogen or an alkyl radical having from 1 to 4 carbon atoms, and providing a process for making an improved cellular polyurethane plastic. More specifically, the invention provides a novel class of catalysts and a process for making cellular polyurethane plastics from any suitable organic compound having at least two reactive hydrogen atoms, such as, for example, a polyester, a polyalkylene ether, a polyalkylene thioether, a polyester amide, or the like, with terminal hydroxy groups, a polyisocyanate and water. The organic compound having the reactive hydrogen atoms, the polyisocyanate, water and one or more of the catalysts selected from the class described above may be mixed together simultaneously or two of the components may be mixed together in a first step and the other components added in subsequent steps. Preferably, however, the organic compound having at least two reactive hydrogen atoms is mixed with more than enough polyisocyanate to react with all of the reactive hydrogen atoms and this mixture is heated or otherwise treated to bring about chemical reaction and produce a prepolymer having terminal NCO groups. This reaction is illustrated by the following equation:

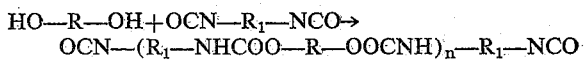

wherein R is derived by condensing an excess of a suitable poly-functional compound, such as, for example, a glycol, glycerine or trimethylol propane, or the like, with either a dicarboxylic acid, an alkylene oxide, or a thioether glycol or the like, $R_1$ is an alkylene or arylene radical which may or may not be halogen substituted and $n$ is an integer. This prepolymer is then reacted with water in the presence of a tertiary amine having the general formula set forth above to form a solidified product having repeating urethane linkages and simultaneously form carbon dioxide as indicated in the following equation:

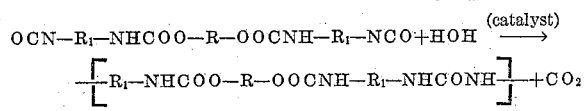

Specific examples of tertiary amines falling within the class provided by this invention include 1-methyl-4-dimethyl amino ethyl piperazine, 1-ethyl-4-diethyl amino ethyl piperazine, 1-propyl-4-dipropyl amino ethyl piperazine, 1,2-dimethyl-4-dimethyl amino ethyl piperazine, 1,2,3,5,6-penta methyl-4-dimethyl amino ethyl piperazine, 1-butyl-4-dibutyl amino ethyl piperazine, 1-methyl-4-dimethyl amino propyl piperazine, 1-methyl-4-dimethyl amino butyl piperazine and the like. The alkyl radicals R' on the nitrogen atoms will usually be the same, but the invention also contemplates compounds wherein the R' radicals are different. Of this class of compounds, 1-methyl-4-dimethyl amino ethyl piperazine is preferred as a catalyst for use in the manufacture of cellular polyurethane plastics because it properly accelerates the chemical reaction and yet the foam produced by a process using this catalyst does not have an obnoxious odor a relatively short time after it has been manufactured. This compound has a boiling point of about 91° C. to 96° C. at about 11 mm. pressure, and foam prepared with this compound as the catalyst does not have an obnoxious odor within one or two days after its preparation if it has been stored where there is good air circulation at about 20° C. or higher. Even while the compound is present in the foam, no particularly obnoxious odor is apparent because such small concentrations are required and the mild ammonia-like scent is not particularly offensive. The compound is soluble in water in all proportions which makes it particularly advantageous as a catalyst. The chemical reaction which produces the cellular polyurethane plastic is accelerated much more effectively and rapidly by a catalyst selected from the class of tertiary amines provided by this invention than by such compounds as pyridine, N-ethyl morpholine and diethyl ethanol amine, or the like, which are examples of the heretofore available tertiary amine catalysts.

Any suitable organic polyisocyanate may be used in preparing the cellular polyurethane plastic, but it is preferred to use a diisocyanate. Examples of suitable polyisocyanates are disclosed in the Hoppe et al. patent, 2,764,565, and include ethylene diisocyanate, propylene-1,2-diisocyanate, cyclohexylene-1,2- diisocyanate, 2,4-toluylene diisocyanate, 2,6-toluylene diisocyanate, 3,3'-dichloro-4,4'-biphenylene diisocyanate, triphenyl methane triisocyanate, and the like, or mixtures thereof. The polyester may be prepared from any suitable polycarboxylic acid, including adipic acid and the other acids disclosed in the Hoppe et al. patent. Any of the suitable polyhydric alcohols or amino alcohols disclosed in the aforesaid patent may be used in preparing the polyester. Examples include ethylene glycol, diethylene glycol, trimethylol propane, glycerol, and the like. Moreover, the catalyst provided by the invention is water soluble and can be washed easily from human skin, which is another advantageous characteristic.

The catalyst may be mixed with the other components of a polyurethane plastic by any suitable means, but it has been found most advantageous to inject an aqueous solution of the catalyst into a prepolymer formed by reacting a polyhydroxy compound with an excess of an aromatic diisocyanate. It has been found that the best cellular polyurethane plastic is formed when a polyalkylene ether glycol is reacted with an excess of an arylene diisocyanate and the resulting prepolymer is then reacted with water in the presence of one of the catalytic compounds falling within the class provided by this invention. The apparatus and process disclosed in the aforesaid Hoppe et al. patent, 2,764,565, have been particularly well suited for making polyurethane plastic from reaction mixtures containing the catalyst provided by this invention.

The novel chemical compounds provided by the invention may be prepared by reacting an amino alkylene piperazine with an aldehyde in the presence of formic acid or hydrogen and a catalyst such as Raney nickel or platinum. Taking 1-methyl-4-dimethyl amino ethyl piperazine as an example, a mixture of about 2,580 parts amino ethyl piperazine and about 3,250 parts by weight of 85% formic acid is prepared. A second mixture containing about 1900 parts by weight of 95% paraformaldehyde and about 3,250 parts by weight 85% formic acid is prepared and heated in a suitable reaction vessel to about 90° C. The reaction vessel is provided with a means for adding liquid thereto, a suitable stirrer or other agitating means, a reflux condenser and means for measuring the temperature of the solution. The mixture of amino ethyl piperazine and formic acid prepared above is added to the reaction vessel as rapidly as is possible. The rate of addition must be controlled to permit removal of the gas evolved during the reaction. The temperature of the reaction mixture should be held at about 90° C. during the period in which the mixture is being added. After all of the mixture has been added, the temperature is increased to about 105° C. and held at about this temperature until gas evolution has substantially ceased.

The reflux condenser on the apparatus is then replaced with a distilling column and condenser and the reaction mixture is heated to about 120° C. to distill off as much water as possible. The remaining reaction mixture is mixed with an equal volume of a 50% aqueous solution of potassium hydroxide and this mixture is permitted to stand for about 30 minutes or until two layers have separated out. The top organic amine layer is removed by any suitable means, such as by decanting, and the aqueous layer is again saturated with solid potassium hydroxide. Any organic amine obtained from the aqueous solution is separated therefrom and combined with the amine layer obtained in the earlier separation step. The organic amine is then dried over potassium hydroxide pellets and later distilled under reduced pressure through a distillation column containing beryl saddle packing or other packing suitable for use in a fractionating column. That fraction of the distillate boiling within the range of from about 91° C. to about 96° C. at a pressure of about 11 mm. is withdrawn as the product. The yield obtained from such a process is about 60% or more of the theoretical yield.

The other compounds falling within the class provided by this invention may be prepared by a process similar to that described in the immediate foregoing by substituting the proper aldehyde for the paraformaldehyde. For example, if 1-ethyl-4-diethyl amino ethyl piperazine is desired, acetaldehyde or paraldehyde is used instead of paraformaldehyde. If R" in the general formula above is to be other than an ethylene radical, the proper amino alkylene piperazine is substituted for the amino ethyl piperazine in the foregoing process.

Each of the novel compounds provided by this invention may be used as a catalyst in the preparation of cellular polyurethane plastics which, in turn, have many commercial uses, such as, for example, as interlinings in garments, cushions, carpet underlay, crash pads on automobiles and as sponges.

In order better to describe and further to clarify the invention, the following are detail descriptions of specific embodiments of the invention:

*Example 1*

About 100 parts of a polyalkylene ether prepared by condensing propylene oxide and then condensing this product with sufficient ethylene oxide to provide an ether containing about 10% ($C_2H_4O$) groups in the chain and having a molecular weight of about 1,800 are mixed with about 3 parts by weight trimethylol propane and about 0.02 part benzoyl chloride. This mixture is heated to about 60° C. and about 20 parts of a 80/20 mixture of 2,4-toluylene diisocyanate and 2,6-toluylene diisocyanate are added. Heating is then continued until a temperature of from about 90° C. to about 100° C. is reached and a temperature within this range is maintained until the viscosity of the reaction mass at 73° C. is from about 1,200 to about 1,400 centipoises as determined with a Brookfield spinning disc type viscosimeter. About 16 parts of 80/20 mixture of 2,4-toluylene diisocyanate and 2,6-toluylene diisocyanate are added and the prepolymer and unreacted toluylene diisocyanate mixture is mixed with about 2.5 parts by weight water and about 0.25 part 1-methyl-4-dimethyl amino ethyl piperazine by injecting the water and 1-methyl-4-dimethyl amino ethyl piperazine into a flowing stream of about 100 parts prepolymer. After complete mixing, the reaction mass is discharged into a suitable mold where reaction between the water and the NCO groups proceeds and a cellular product of about 2 pounds per cubic foot is obtained. The mixing of the water and catalyst with the prepolymer is preferably brought about in a device of the type disclosed in the aforesaid Hoppe et al. patent, the temperature of the prepolymer being about 38° C. as it enters the mixing nozzle. The cellular product obtained is substantially free from obnoxious odors and any detectable catalyst odor soon disappears. The prepolymer is prepared by reacting the polyalkylene ether glycol with the diisocyanate under substantially anhydrous conditions.

Example 2

A prepolymer is prepared from a polyalkylene ether, trimethylol propane and an 80/20 mixture of 2,4-toluylene diisocyanate and 2,6-toluylene diisocyanate in accordance with the process described in Example 1 and to 100 parts of this prepolymer are added about 2.3 parts water, from about 0.25 to 0.5 part 1-methyl-4-dimethyl amino ethyl piperazine and about 4 parts of an 80/20 mixture of 2,4-toluylene diisocyanate and 2,6-toluylene diisocyanate. After complete mixing, the reaction mass is transferred to a suitable mold where reaction proceeds with the formation of a cellular polyurethane product having a density of about 2 pounds per cubic foot.

Example 3

To about 100 parts of prepolymer formed in accordance with the process of Example 1 are added about 3.5 parts water, about 1.0 part 1-methyl-4-dimethyl amino ethyl piperazine and from about 10 to about 13 parts of a mixture of an 80/20 mixture of 2,4-toluylene diisocyanate and 2,6-toluylene diisocyanate. Upon chemical reaction, a cellular polyurethane product is obtained having a density of about 1.5 pounds per cubic foot.

Example 4

About 100 parts of a polypropylene ether prepared from propylene oxide and having a molecular weight of about 2,000 are mixed with about 3 parts by weight trimethylol propane and about 0.02 part benzoyl chloride. This mixture is heated to about 60° C. and about 20 parts of an 80/20 mixture of 2,4-toluylene diisocyanate and 2,6-toluylene diisocyanate are added. Heating is then continued until a temperature of from about 90° C. to about 100° C. is reached and a temperature within this range is maintained until the viscosity of the reaction mass at 73° C. is from about 1,200 to about 1,400 centipoises as determined with a Brookfield spinning disc type viscosimeter. About 16 mols of 80/20 mixture of 2,4-toluylene diisocyanate and 2,6-toluylene diisocyanate are added and the prepolymer and unreacted toluylene diisocyanate mixture is mixed with about 2.3 parts by weight water and from about 0.25 to about 0.5 part by weight 1-methyl-4-dimethyl amino ethyl piperazine and about 4.5 parts of an 80/20 mixture of 2,4-toluylene diisocyanate and 2,6-toluylene diisocyanate by injecting the water and catalyst into a flowing stream of about 100 parts prepolymer. After complete mixing, the reaction mass is discharged into a suitable mold where reaction between the water and the NCO groups proceeds and a cellular product of about 2.2 pounds per cubic foot is otbained. The mixing of the water and catalyst with the prepolymer is preferably brought about in a device of the type disclosed in the aforesaid Hoppe et al. patent.

Example 5

About 100 parts by weight polyester, prepared by condensing about 15 mols adipic acid, about 16 mols diethylene glycol and about 1 mol trimethylol propane are mixed with about 39 parts by weight toluylene diisocyanate and an activator mixture containing about 1.0 part 1-methyl-4-dimethyl amino ethylene piperazine and about 2.5 parts water. The toluylene diisocyanate and activator mixture are injected into a stream of the polyester by means of the apparatus disclosed by Hoppe et al. in U.S. Patent 2,764,565. Of course, any other suitable mixing device can be used, but best results are obtained with the apparatus disclosed in this patent. The mixture is discharged and chemical reaction permitted to produce a cellular polyurethane plastic.

The polyesters may be prepared by any known method, such as by reacting one of the dicarboxylic acids with a glycol or with a polyhydric alcohol having more than two hydroxyl groups. Examples of suitable acids include adipic, malonic, succinic, sebacic, and the like, while suitable polyhydric alcohols include ethylene glycol, 1,3-butane diol, 1,4-butane diol, diethylene glycol, triethylene glycol, trimethylol propane, glycerine and the like. The polyalkylene ethers may be prepared by any suitable means, such as, for example, by condensing propylene oxide, ethylene oxide, mixtures thereof, or by condensing the oxide with a glycol or trihydric alcohol. The polythioethers may be prepared by any suitable means, such as, for example, by condensing lower molecular weight thioether, such as, for example, thiodiglycol, or by condensing one or more of the lower thioethers with an ether, such as, for example, diethylene glycol, or the like.

It is to be understood that one of the other compounds of the class provided by this invention may be substituted for the 1-methyl-4-dimethyl amino ethyl piperazine in the foregoing embodiments. Also, it is to be understood that the catalysts may be used to advantage in making foams from any polyester, or any other suitable organic compound capable of forming polyurethanes by essentially the same method as described in the foregoing. If desired, the organic compound having reactive hydrogen atoms may be mixed simultaneously with the polyisocyanate, water and catalyst, but it is preferred to form the prepolymer and to inject the novel catalyst into the prepolymer.

The catalyst may be used in minor amounts or, in other words, "catalytic amounts." Usually, less of this catalyst will be required than is required of the heretofore available tertiary amine catalysts. For most purposes, from about 0.25 to about 2.0 parts catalyst per 100 parts prepolymer or per 100 parts organic compound having reactive hydrogen atoms and polyisocyanate are preferred. Preferably, the catalyst is mixed with the water used as the chain-extender or cross-linker.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims. For example, it is to be understood that any suitable polyisothiocyanates, including those polyisothiocyanates corresponding to the polyisocyanates listed hereinbefore, may be substituted for the polyisocyanates in the foregoing examples and may be otherwise used in lieu of a polyisocyanate in practicing the invention. The polyethers, polyesters, polythioethers and polyester amides with terminal hydroxy groups contemplated by the invention have a molecular weight of at least about 500 and preferably of not more than about 10,000.

The terms "polyalkylene ether" and polyalkylene ether glycol" have been used interchangeably herein to describe the condensation product of an alkylene oxide or the condensation product of an alkylene oxide and a glycol or the condensation product of an alkylene oxide, a glycol and a minor amount of trihydric alcohol. It is to be understood that either of these terms is intended to means such a condensation product having terminal hydroxyl groups which may or may not contain an occasional but very infrequent hydroxyl group somewhere along the chain. In preparing a prepolymer by reacting a polyisocyanate with an organic compound having reactive hydrogen atoms, preferably at least one mol polyisocyanate per reactive hydrogen atom is used. Preferably, this reaction should be conducted under substantially anhydrous conditions. That is, a typical mixture of polyisocyanate and organic compound having reactive hydrogen atoms and capable of forming polyurethanes will not contain more than about 0.1% by weight water.

The viscosity of the prepolymer is determined with a standard Brookfield Synchro-lectric Viscosimeter described on page 845 of the publication entitled "Fisher's Modern Laboratory Applicances," No. 15-348-150, copyright 1952, using the standard No. 4 spindle turning 6 revolutions per minute.

The OH number of the polyester and polyether may be as low as 15 but it is preferred to use a polyester or polyether having an OH number of at least about 30. The OH number may be as great as about 400 or more. The acid number of the polyester is preferably 0 and preferably should not be greater than about 2.

What is claimed is:

1. In a method for making cellular polyurethane plastics comprising mixing a polyalkylene ether glycol having a molecular weight of at least about 500 and an hydroxyl number of at least about 15, an excess of an organic polyisocyanate over that required to react with all of the hydroxyl groups of the said glycol, and water, and effecting chemical reaction to produce a cellular polyurethane plastic, the improvement which comprises including in the reaction mixture a catalytic amount of a catalyst having the formula:

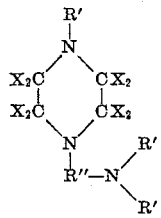

wherein R' is an alkyl radical having from 1 to 4 carbon atoms, R" is an alkylene radical having from 2 to 4 carbon atoms and X is a member selected from the group consisting of hydrogen and an alkyl radical having from 1 to 4 carbon atoms.

2. The process of claim 1 wherein said catalyst is 1-methyl-4-dimethyl amino ethyl piperazine.

3. The process of claim 1 wherein said catalyst is 1-ethyl-4-diethyl amino ethyl piperazine.

4. The process of claim 1 wherein said catalyst is 1-propyl-4-dipropyl amino ethyl piperazine.

5. The process of claim 1 wherein said catalyst is 1-isopropyl-4-diisopropyl amino ethyl piperazine.

6. The process of claim 1 wherein said catalyst is 1-butyl-4-dibutyl amino ethyl piperazine.

7. In the preparation of a cellular polyurethane plastic by a process which comprises mixing an organic compound having a molecular weight of at least about 500, an hydroxyl number of at least about 15 and an acid number of from about zero to about 2, said organic compound being a member selected from the group consisting of a polyester prepared by condensation of a polycarboxylic acid and a polyhydric alcohol, a polyhydric polyalkylene ether having from 2 to 3 hydroxyl groups, a polythioether glycol, an organic polyisocyanate and water, said organic polyisocyanate being present in an amount in excess of that required to react with the reactive hydrogen atoms of said group member, and effecting chemical reaction to produce a cellular polyurethane plastic, the improvement which comprises including in the reaction mixture a catalytic amount of a compound having the formula:

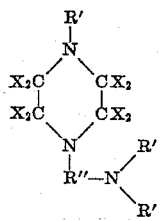

wherein R' is an alkyl radical having from 1 to 4 carbon atoms, R" is an alkylene radical having from 2 to 4 carbon atoms and X is a member selected from the group consisting of hydrogen and an alkyl radical having from 1 to 4 carbon atoms.

8. The process of claim 7 wherein the catalyst is 1-methyl-4-dimethyl amino ethyl piperazine.

9. The process of claim 7 wherein the catalyst is 1-ethyl-4-diethyl amino ethyl piperazine.

10. The process of claim 7 wherein the catalyst is 1-propyl-4-dipropyl amino ethyl piperazine.

11. The process of claim 7 wherein the catalyst is 1-isopropyl-4-diisopropyl amino ethyl piperazine.

12. The process of claim 7 wherein the catalyst is 1-butyl-4-dibutyl amino ethyl piperazine.

References Cited in the file of this patent

UNITED STATES PATENTS

| | | |
|---|---|---|
| 2,513,026 | Jacob et al. | June 27, 1950 |
| 2,534,774 | Jacob et al. | Dec. 19, 1950 |
| 2,650,212 | Windemuth | Aug. 25, 1953 |

OTHER REFERENCES

Clarke et al.: "Journal of American Chem. Soc.," volume 55, pages 4571–4587, 1933.

Stewart et al.: "Journal of Organic Chem.," volume 13, pages 134–143, 1948.

UNITED STATES PATENT OFFICE
CERTIFICATE OF CORRECTION

Patent No. 2,949,431　　　　　　　　　　　　　　August 16, 1960

J. W. Britain

It is hereby certified that error appears in the printed specification of the above numbered patent requiring correction and that the said Letters Patent should read as corrected below.

Column 2, lines 3 to 11, the formula should appear as shown below instead of as in the patent:

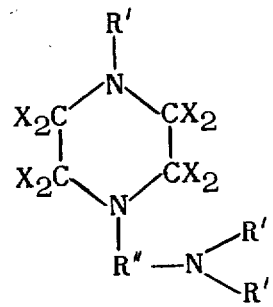

Signed and sealed this 18th day of April 1961.

(SEAL)
Attest:

ERNEST W. SWIDER
Attesting Officer

DAVID L. LADD
Commissioner of Patents